US011780432B2

(12) United States Patent
Preissler

(10) Patent No.: US 11,780,432 B2
(45) Date of Patent: Oct. 10, 2023

(54) TRAINING METHOD FOR A DRIVER ASSISTANCE METHOD, DRIVER ASSISTANCE METHOD, CONTROL DEVICE AND VEHICLE COMPRISING THE CONTROL DEVICE

(71) Applicant: Robert Bosch GmbH, Stuttgart (DE)

(72) Inventor: Peter Preissler, Dorndorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 525 days.

(21) Appl. No.: 16/772,545

(22) PCT Filed: Apr. 30, 2019

(86) PCT No.: PCT/EP2019/061128
§ 371 (c)(1),
(2) Date: Jun. 12, 2020

(87) PCT Pub. No.: WO2019/223974
PCT Pub. Date: Nov. 28, 2019

(65) Prior Publication Data
US 2020/0384987 A1 Dec. 10, 2020

(30) Foreign Application Priority Data
May 25, 2018 (DE) ...................... 10 2018 208 277.4

(51) Int. Cl.
*B60W 30/095* (2012.01)
*B60W 10/04* (2006.01)
(Continued)

(52) U.S. Cl.
CPC ............. *B60W 30/095* (2013.01); *B60R 1/00* (2013.01); *B60W 10/04* (2013.01); *B60W 10/20* (2013.01);
(Continued)

(58) Field of Classification Search
CPC .... B60W 30/095; B60W 10/04; B60W 10/20; B60W 50/14; B60W 2050/146;
(Continued)

(56) References Cited

U.S. PATENT DOCUMENTS 9,522,675 B1 12/2016 You et al.
2010/0049402 A1 2/2010 Tanaka
(Continued)

FOREIGN PATENT DOCUMENTS

DE 102010023162 A1 12/2011
DE 112010005572 T5 * 2/2013 ............... B60R 1/00
(Continued)

OTHER PUBLICATIONS (EP1508780A1)—English translation (Year: 2005).*
(Continued)

*Primary Examiner* — Abby Y Lin
*Assistant Examiner* — Renee LaRose
(74) *Attorney, Agent, or Firm* — NORTON ROSE FULBRIGHT US LLP; Gerard Messina

(57) ABSTRACT

A training method for a driver assistance method of a vehicle. The method includes: recording a sequence of camera images during a training run of the vehicle, guided by a user, along a desired trajectory; determining a driving corridor for the driver assistance method along the desired trajectory based on image processing of the recorded sequence of camera images; displaying the recorded sequence of camera images and/or a surrounding environment model determined based on the recorded sequence of camera images on a display, at least the determined driving corridor being displayed as an overlay superimposed on the display; and storing the driving corridor in an electronic memory of the vehicle, a recording of an input by the user for adapting a boundary of the determined driving corridor (Continued)

during the displaying and an adapting of the determined driving corridor based on the recorded input being carried out.

14 Claims, 8 Drawing Sheets

(51) Int. Cl.
  *B60W 10/20*  (2006.01)
  *B60W 50/14*  (2020.01)
  *B60R 1/00*  (2022.01)

(52) U.S. Cl.
  CPC ......... *B60W 50/14* (2013.01); *B60R 2300/10* (2013.01); *B60R 2300/20* (2013.01); *B60R 2300/304* (2013.01); *B60W 2050/146* (2013.01); *B60W 2420/42* (2013.01); *B60W 2554/80* (2020.02)

(58) Field of Classification Search
  CPC . B60W 2420/42; B60W 2554/80; B60R 1/00; B60R 2300/10; B60R 2300/20; B60R 2300/304; B62D 15/0275; B62D 15/0285; G05D 2201/0213; G05D 1/0221; G05D 1/0246; G05D 1/0274
  See application file for complete search history.

(56) References Cited

U.S. PATENT DOCUMENTS

| | | | |
|---|---|---|---|
| 2021/0039715 A1* | 2/2021 | Ferrer | .................... H04W 4/46 |
| 2021/0163026 A1* | 6/2021 | Ochida | ........... B60W 30/18163 |

FOREIGN PATENT DOCUMENTS

| | | | | |
|---|---|---|---|---|
| DE | 102015014614 A1 | | 5/2016 | |
| DE | 102015212581 A1 | | 1/2017 | |
| DE | 102016100235 A1 | | 7/2017 | |
| DE | 102016122215 A1 | | 5/2018 | |
| EP | 1508780 A1 | * | 2/2005 | ......... G01C 21/3638 |
| EP | 3284650 A1 | * | 2/2018 | ............. B60D 1/245 |
| EP | 3284650 A1 | | 2/2018 | |
| JP | 2006298115 A | | 11/2006 | |
| JP | 2008174000 A | | 7/2008 | |
| JP | 2013241088 A | | 12/2013 | |
| JP | 2018075899 A | | 5/2018 | |
| WO | 2017028849 A1 | | 2/2017 | |
| WO | 2018070021 A1 | | 4/2018 | |

OTHER PUBLICATIONS

EP3284650A1 (Year: 2018).*
DE112010005572T5—english trans (Year: 2010).*
International Search Report for PCT/EP2019/061128, dated Nov. 5, 2019.

* cited by examiner

TRAINING METHOD FOR A DRIVER ASSISTANCE METHOD, DRIVER ASSISTANCE METHOD, CONTROL DEVICE AND VEHICLE COMPRISING THE CONTROL DEVICE

FIELD

The present invention relates to a training method for a driver assistance method of a vehicle, said driver assistance method, a control device for carrying out the training method and for carrying out the driver assistance method, as well as a vehicle comprising the control device.

BACKGROUND INFORMATION

U.S. Patent Application Publication No. US 2010/0049402 A1 describes a driver assistance system for parking a vehicle, wherein a target parking position may be adapted by a user of the driver assistance system.

U.S. Pat. No. 9,522,675 B1 describes a parking control system, a user making a first selection between parallel parking and perpendicular parking and a second selection between rearward parking and forward parking.

SUMMARY

An object of the present invention is to improve a support of a driver via a driver assistance method at a known location. This object may be achieved according to example embodiments of the present invention.

The present invention relates to a training method for a driver assistance method of a vehicle, the vehicle comprising at least one camera. In accordance with an example embodiment of the training method, initially, the training method records a sequence of camera images, in particular a video sequence, during a vehicle training run guided by a user along a desired trajectory. In other words, the driver drives the vehicle along a trajectory of his choice from a starting point to an end point, a video sequence being recorded by the camera during this training run. For example, the user drives the vehicle from an entryway to an underground parking garage to a parking spot in the underground parking garage. In another example, the user drives the vehicle from a position in front of an entrance to a property to a parking spot on the property. Subsequently, a driving corridor along the desired trajectory is determined for the driver assistance method based on image processing of the recorded sequence of camera images. In other words, a tolerance area is determined for the trajectory desired by the user, the tolerance area or driving corridor representing an area in which the vehicle may be moved during a later execution of the driver assistance method, for example in order to drive around non-stationary obstacles. In a subsequent step, the recorded sequence of camera images and/or a surrounding environment model determined as a function of the recorded sequence of camera images is shown on a display for the user. In this displaying, the determined driving corridor is displayed as an overlay superimposed onto the display. During this displaying, an input by the user for adapting a boundary of the determined driving corridor is recorded. In other words, the user changes the boundary of the determined driving corridor during the display. Thereafter, the determined driving corridor is adapted based on the recorded input and the determined driving corridor and/or the adapted driving corridor is stored in an electronic memory in the vehicle.

Determining the driving corridor by the training method produces the advantage that a vehicle may be moved within the driving corridor along a variable trajectory semiautomatically or automatically while the driver assistance method is being carried out; in other words, the vehicle may, for example, avoid obstructions such as a ball without having to abort the driver assistance method. The adaptation of the driving corridor by the user furthermore has the advantage of preventing flower beds or lawns or curbs from being driven on or driven over during the driver assistance method. Thus, the training method avoids undesired trajectories when the driver assistance method is carried out.

In a preferred embodiment of the present invention, the position coordinates of the vehicle are recorded during the training method. The position coordinates may represent the position relative to a global reference point (for example GPS coordinates) or relative to a specific position or a reference point of the desired trajectory, for example a starting point of the trajectory. Subsequently, the stored driving corridor is assigned to the recorded position coordinates. This embodiment provides the advantage that the driver assistance method may be carried out at multiple locations using a driving corridor which is determined based on position, and that the driver assistance method may be started semiautomatically or automatically based on a recording of position coordinates.

In an especially preferred specific embodiment, distances between the vehicle and objects in the surrounding area of the vehicle are recorded during the training run guided by the user, a surrounding environment model or a depth map being determined as a function of the recorded distances in particular.

Subsequently, the driving corridor is additionally determined based on the recorded distances or the depth map or the surrounding environment model. This advantageously more precisely defines the driving corridor relative to the surroundings. Furthermore, in this specific embodiment, objects and/or obstructions in the surrounding environment, for example curbs, are more reliably detected. Moreover, there is the advantage that the recording of image data and the evaluation thereof only has to be carried out during the training run, whereas for purposes of later carrying out the driver assistance method a driving trajectory may be based alternatively or additionally on recorded distances, for example in order to reliably carry out the driver assistance method when lighting or weather conditions is/are poor, or to improve the precision of the driving corridor in general.

In a further development of the present invention, at least one segment, segment boundary, object edge and/or object is detected based on an image analysis or image processing of at least one recorded camera image and/or based on recorded distance data. For example, segment or object detection is carried out using a neural network which is trained for the respective detection target. Subsequently, in the displaying of the recorded sequence of camera images and/or the determined surrounding environment model on a display, the detected segment, segment boundary, object edge and/or object is additionally shown as an overlay superimposed onto the display. This provides the advantage that the user is supported by the displayed segment, segment boundary, object edge and/or object when providing input for adapting a boundary of the determined driving corridor. Optionally or alternatively, the boundary of the determined driving corridor may be pre-adapted based on the detected segment, segment boundary, object edge and/or object. This provides the advantage that input by the user to adapt the boundary of the determined driving corridor is made easier, and/or that the driving corridor is automatically corrected prior to the display or input.

In another embodiment of the present invention, the adaptation of the boundary of the determined driving corridor may be performed in sections along the determined driving corridor or along the desired trajectory based on the user's input and/or may be performed based on markings indicated in the display at the boundaries of the overlaid driving corridor. For example, the user may advantageously change the boundary of the determined driving corridor by moving a finger on a touchscreen. This embodiment of the invention facilitates the input for adapting the boundary of the determined driving corridor.

Further, there may be a provision for the displaying of the recorded sequence of camera images and/or the determined surrounding environment model to take place on a display of a mobile electronic device, and for the recording of the user's input for adapting the boundary of the determined driving corridor to be performed using the mobile electronic device. This makes the determination of the driving corridor by the user more comfortable.

In another embodiment of the present invention, a time input for the performance of the driver assistance method on the part of the user is recorded. Subsequently, the stored driving corridor is assigned to the recorded time input. This produces the advantage that for example the un-parking of the vehicle in the morning may be automated at a specified time, reducing the time and operational effort required by the user.

The present invention also relates to a driver assistance method for the vehicle. In accordance with an example embodiment of the present invention, an driver assistance method comprises a recording of a start command input. It is preferable for the start command input for starting the driver assistance method to be performed by the user. Alternatively, the start command input may be automated based on the position coordinates assigned and/or based on the time input assigned. After the start command input is given, a recording of a sequence of camera images and/or a recording of distances between the vehicle and objects in a surrounding environment of the vehicle is carried out. Afterwards, the stored driving corridor is loaded, the stored driving corridor having been determined by the training method according to the present invention. A determination of at least one assisted trajectory inside the driving corridor is then performed based on the vehicle geometry, the recorded sequence of camera images and/or the recorded distances and based on the loaded driving corridor. Subsequently, the vehicle is controlled based on the determined assisted trajectory so that the vehicle is only moved within the driving corridor, at least one drive motor and/or one steering motor of the vehicle being controlled. The driver assistance method makes semiautomatic or automatic driving of the vehicle possible from a starting point along a situation-dependent assisted trajectory to an end point or around obstacles within the driving corridor, the driving corridor having been precisely defined by the user.

In a preferred embodiment of the present invention, position coordinates of the vehicle are recorded, and the stored driving corridor is loaded based on the recorded position coordinates.

Moreover, the driver assistance method may include an optical and/or acoustic display of a warning for the user, in particular on a mobile electronic device, and an abortion of the driver assistance method prior to control of the vehicle if no assisted trajectory free of obstructions is determined within the loaded driving corridor.

The present invention also relates to a control device, the control device being designed to carry out a training method according to the present invention and to carry out a driver assistance method according to the present invention.

The present invention also relates to the vehicle comprising the control device according to the present invention.

Further advantages can be found in the description below of exemplary embodiments with reference to the figures.

DETAILED DESCRIPTION OF EXAMPLE EMBODIMENTS

Figure 1:
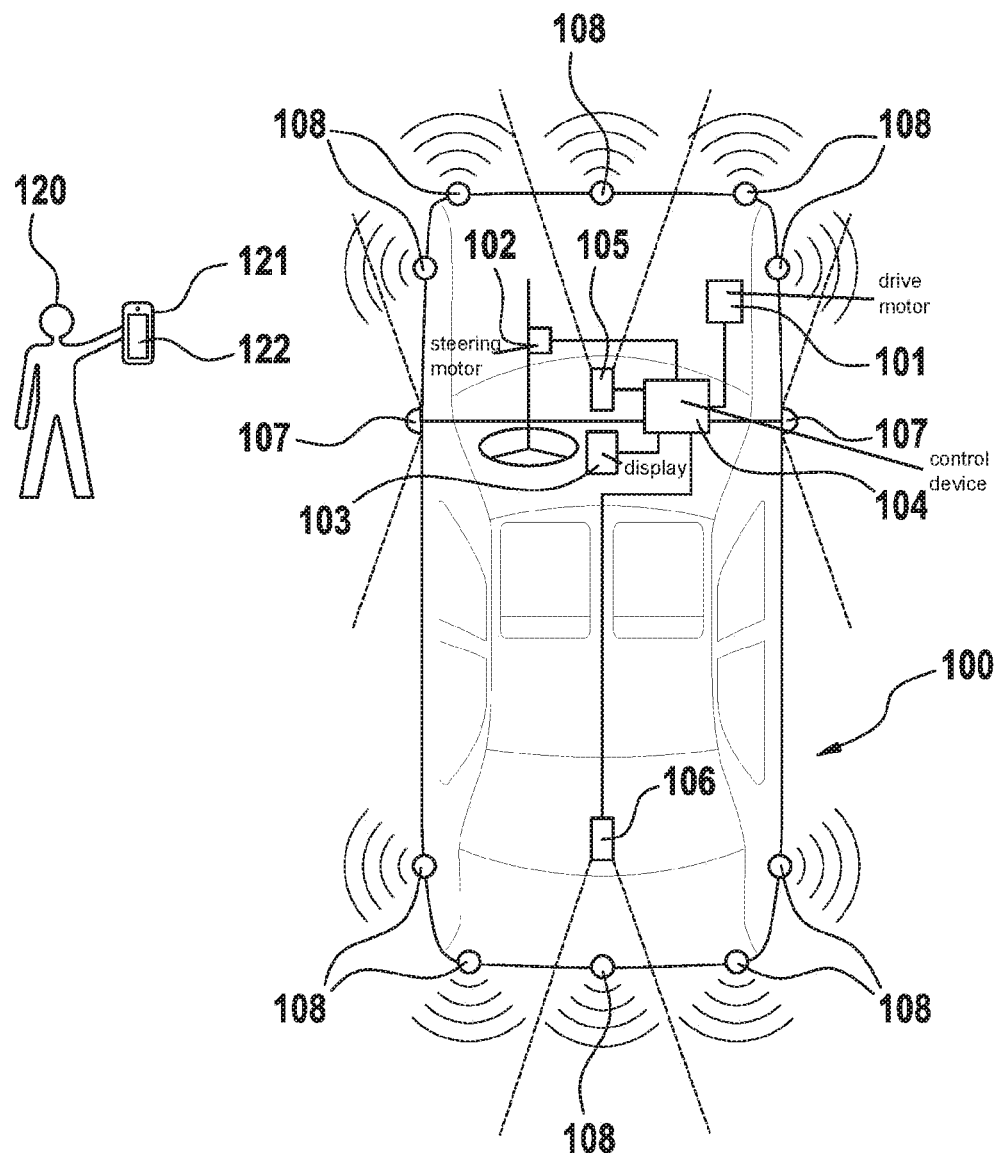
FIG. 1 shows a vehicle in accordance with an example embodiment of the present invention.

FIG. 1 shows a vehicle 100 in a top view. Vehicle 100 comprises a drive motor 101 for driving vehicle 100 and a steering motor 102 for steering vehicle 100. A control device 104 of vehicle 100 is designed to control drive motor 101 and steering motor 102. A display 103 for displaying information for the user of vehicle 100 is also disposed in vehicle 100. Display 103 is controlled by a control device 104 and may comprise a touchscreen for recording an input by the user or an alternative input element. Control device 104 is designed to record camera data or acquired camera images and/or a sequence of camera images or video sequences from a forward-directed camera 105, a rearward-directed camera 106 and two lateral wide-angle cameras 107 and to control display 103 in displaying said recorded camera data and/or to control a surrounding environment model. Cameras 105, 106 and 107 are designed to record camera images or video sequences of the environment around vehicle 100. Other cameras may also be provided. Vehicle 100 also comprises an ultrasonic sensor system. The ultrasonic sensor system in this example comprises ten ultrasonic sensors 108 connected to control device 104. Accordingly, control device 104 is designed to record the distances between vehicle 100 and objects in the surrounding environment of vehicle 100, the distances having been recorded using the ultrasonic sensors 108. Furthermore, a mobile electronic device 121 having a display device 122 may be connected to control device 104 of vehicle 100 via a wireless radio connection, it being possible for display device 122 to comprise a touchscreen for recording an input by user 120 or alternative input element of mobile electronic device 121.

Figure 2:
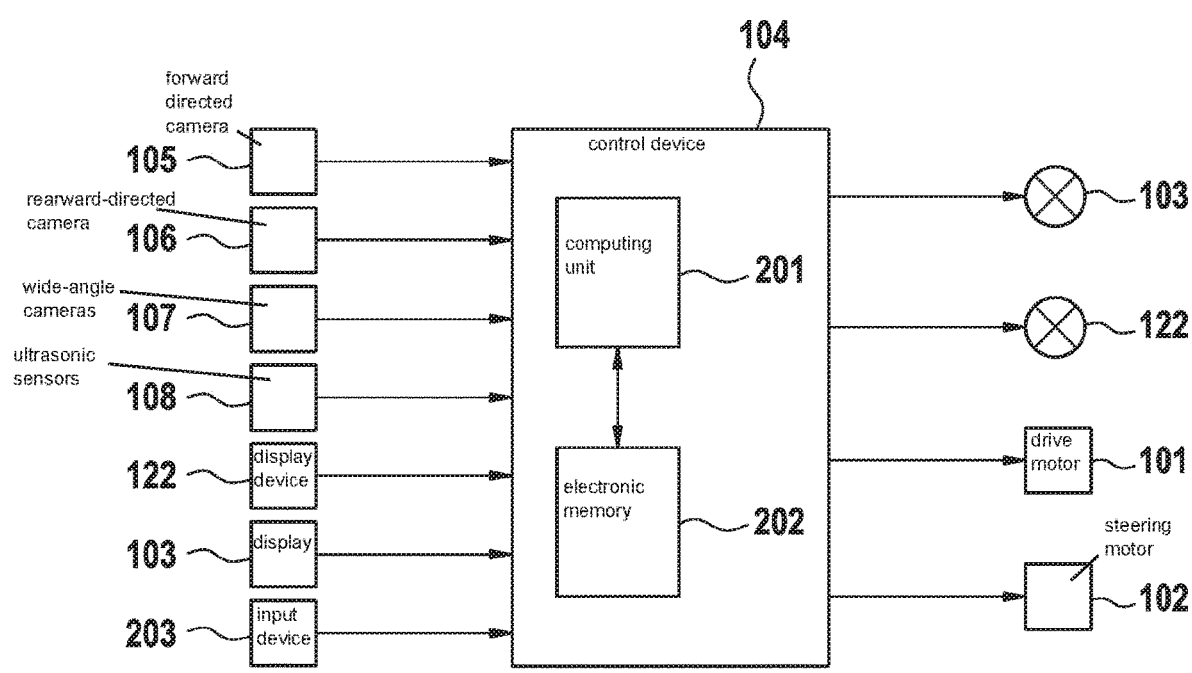
FIG. 2 shows a control device in accordance with an example embodiment of the present invention.

In FIG. 2, control device 104 of the exemplary embodiment of FIG. 1 is shown as a block diagram. Control device 104 records camera data, i.e., camera images and/or a sequence of camera images or a video sequence, from forward-directed camera 105, rearward-directed camera 106 and the two lateral wide-angle cameras 107. Furthermore, control device 104 records distance data from ultrasonic sensors 108 of the ultrasonic sensor system. Moreover, control device 104 is designed to record a user input via a touchscreen of display 103 or of display device 122 and/or via another input element 203, input element 203 being disposed on the steering wheel of vehicle 100, for example. The connection to touchscreen 122 of mobile electronic device 121 is accomplished using a wireless radio connection. The control device further comprises a computing unit 201 connected to an electronic memory 202 of control device 104. Control device 104 is designed to control display 103, display device 122, drive motor 101 and/or steering motor 102.

Figure 3:
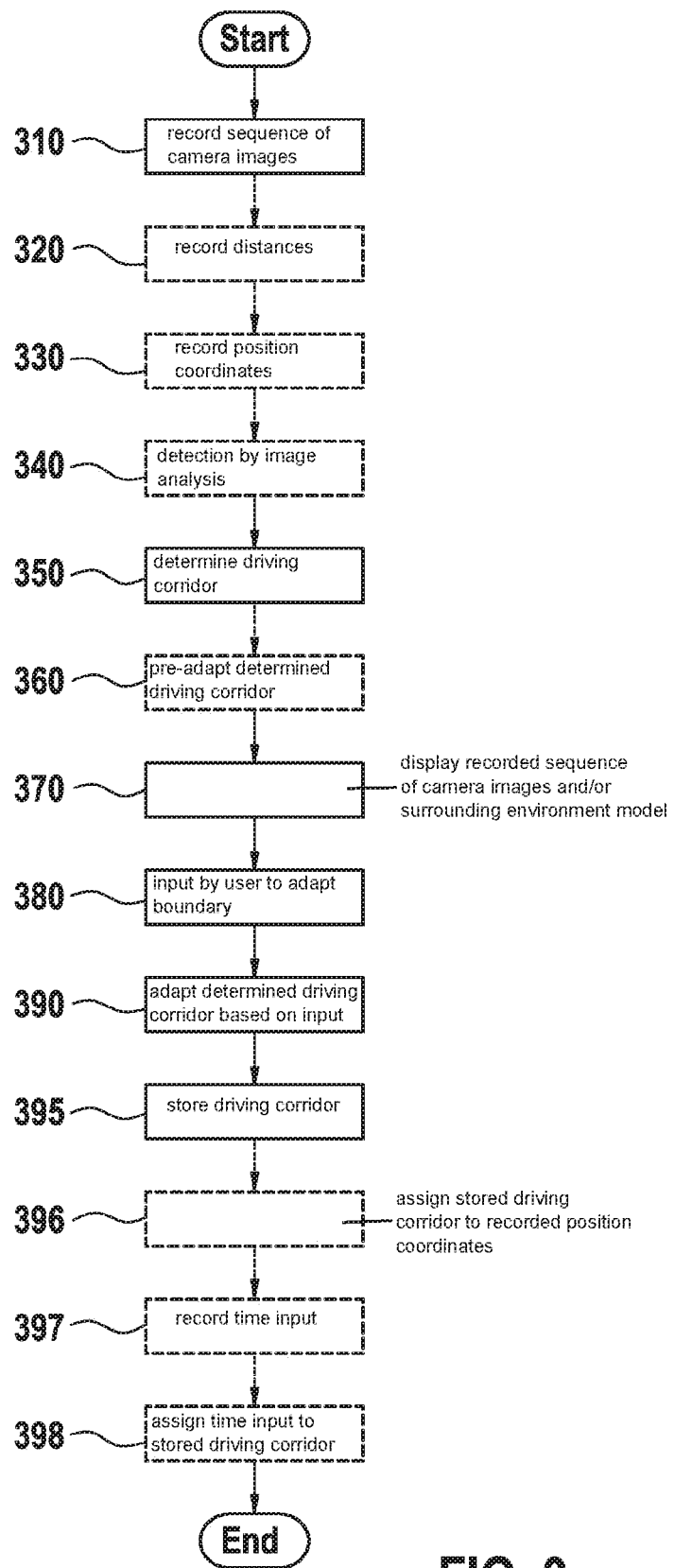
FIG. 3 shows a flow diagram of the training method as a block diagram in accordance with an example embodiment of the present invention.

Shown in FIG. 3 as a block diagram is a flow diagram of a training method of a driver assistance method in accordance with an example embodiment of the present invention. First, in a step 310, at least one sequence of camera images of the surrounding environment of vehicle 100 is recorded using the at least one camera 105, 106 and/or 107 while the training method is carried out by the user, i.e., while the user moves vehicle 100 along a desired trajectory from a start point to an end point. In a further step 320, a recording of distances using the ultrasonic sensor system or ultrasonic sensors 108 may be provided. Optionally, a recording 330 of position coordinates of vehicle 100 may be performed as well. Another option is a detection of objects, object boundaries, segments and/or segment boundaries by an image analysis 340 of at least one camera image of the recorded sequence of camera images. The detection by image analysis 340 is performed for example using a neural network trained by a plurality of training data. Subsequently, a determination 350 of a driving corridor for the driver assistance method along the desired trajectory is performed based on the image processing of the recorded sequence of camera images. In a simple exemplary embodiment, the determined driving corridor corresponds to the route envelope or driven area traversed during the training method along the desired trajectory of vehicle 100, the driving corridor preferably including the traversed route envelope and an additional tolerance area. The tolerance area widens the traversed route envelope, for example laterally, by 1 cm to 5 m. The driving corridor represents an area allowed or drivable for moving vehicle 100 during the driver assistance method. Optionally, the determined driving corridor may be pre-adapted in a step 360 based on the detected segment, segment boundary, object edge and/or object in the surrounding environment of vehicle 100. Subsequently, in step 370, the recorded sequence of camera images and/or a surrounding environment model determined as a function of the recorded sequence of camera images is shown on display 103, 122. Superimposed on this display is at least the determined or pre-adapted driving corridor as an overlay. In a further step 380, an input by the user to adapt a boundary of the determined driving corridor is recorded during display 370. For example, the user may slightly shift the boundary of the driving corridor on a touchscreen of display 103 or 122 by moving a finger. The recording 380 of the user's input may be performed in sections along the determined driving corridor or along the desired trajectory based on the markings indicated in the display at the boundaries of the overlaid driving corridor. In this way, the user himself defines the driving corridor to be stored. Subsequently, an adaptation 390 of the determined driving corridor is performed based on the input recorded in step 380. Finally, the determined or pre-adapted driving corridor or the driving corridor adapted by the driver is stored in a step 395. Optionally, an assignment 396 of the stored driving corridor to the recorded position coordinates may be performed. As an option, a recording 397 of a time input for carrying out the driver assistance method may also be performed by the user, and this time input may be assigned to the stored driving corridor in a step 398.

Figure 4:
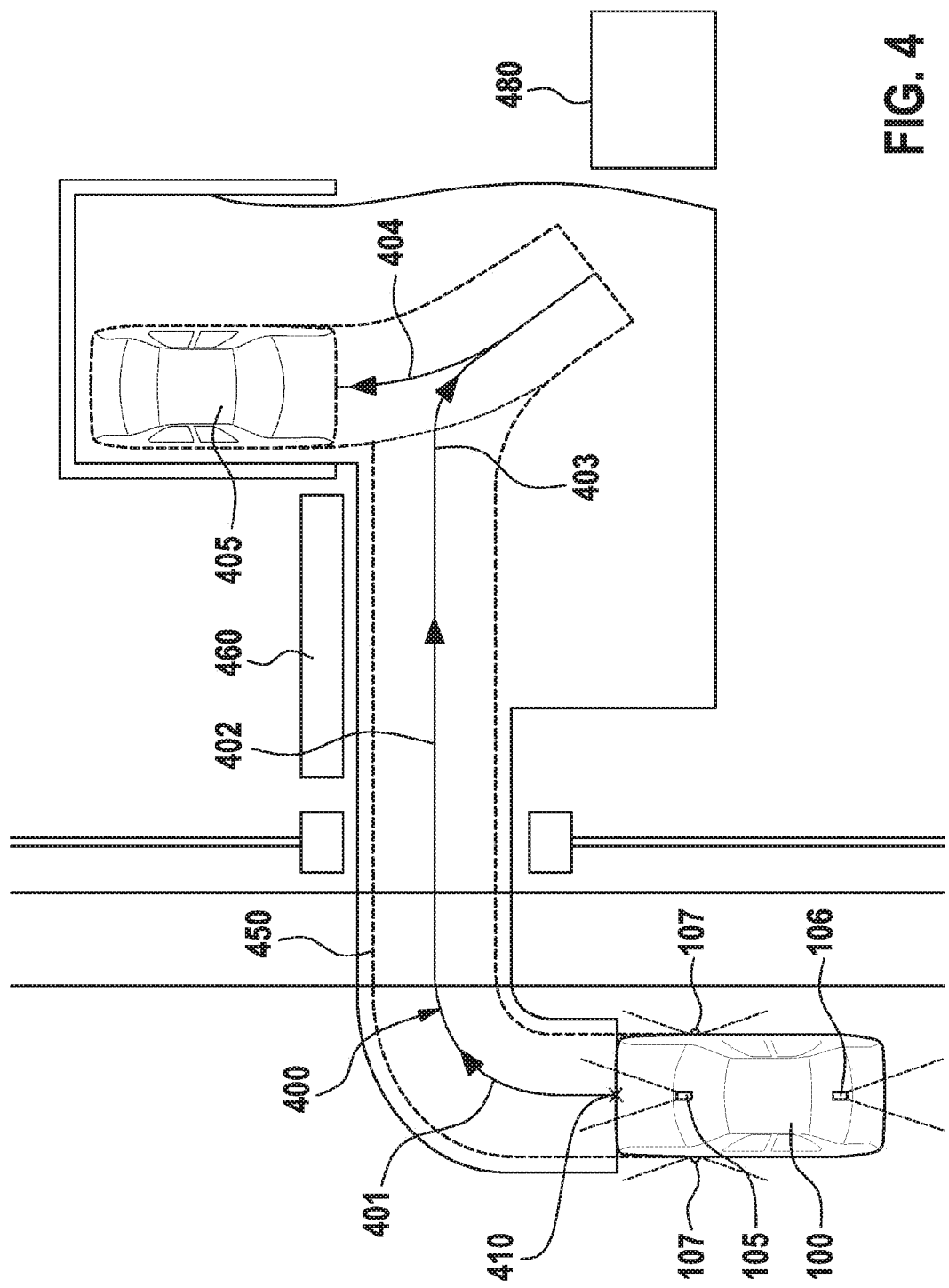
FIG. 4 shows a representation of a surrounding environment model, including a desired trajectory in accordance with an example embodiment of the present invention.

FIG. 4 shows a surrounding environment model with a superimposed overlay of the traversed or desired trajectory 400. The user traverses this desired trajectory 400 with vehicle 100 during the training method by manual steering, from a start position 410 to an end position or parked position 405. During this training run, cameras 105, 106 and/or 107 record the surrounding environment of vehicle 100. The surrounding environment model shown is determined based on the camera images recorded using cameras 105, 106 and/or 107 and/or based on the distances recorded using the ultrasonic sensors 108. As shown in FIG. 4, trajectory 400 is made up for example of a plurality of route sections 401, 402, 403, 404, 405 and 410, i.e., a first curve to the right 401, a straightaway section 402, a second curve to the right 403 and a reversal 404 in reverse gear, as well as the start position 410 and the end position 405. Moreover, a dashed route envelope 450 can be seen. Route envelope 450 represents the area actually driven by vehicle 100 during the training run. The area which is drivable in principle for vehicle 100 is not evenly distributed about route envelope 450; for example, the flower bed 460 lying directly next to the route envelope and a children's playground 480 should not be driven upon during a driver assistance method.

Figure 5:
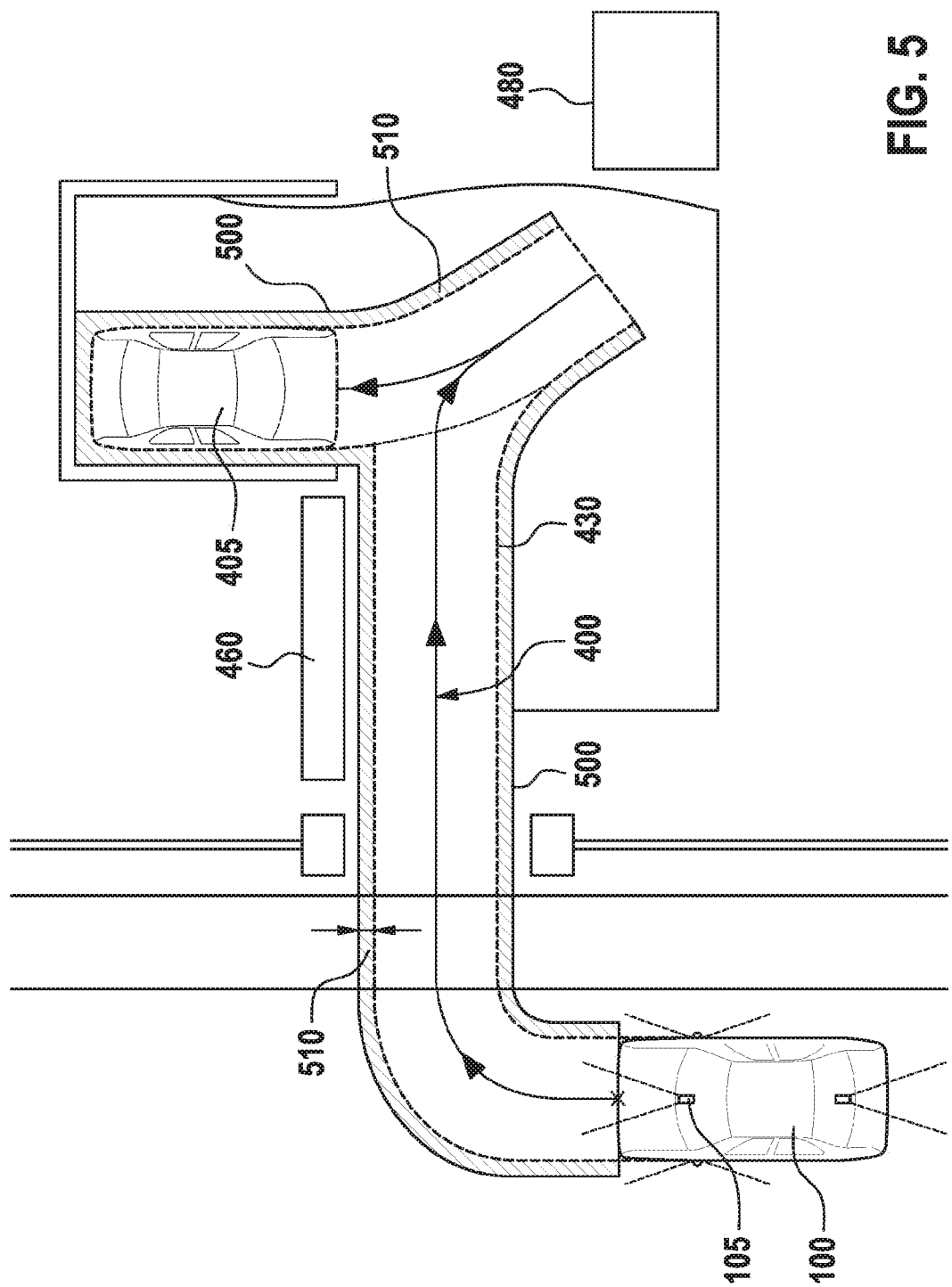
FIG. 5 shows a representation of a surrounding environment model, including an overlaid driving corridor in accordance with an example embodiment of the present invention.

FIG. 5 shows a surrounding environment model according to FIG. 4 with the determined driving corridor 500 overlaid thereon. Route envelope 450 lies within determined driving corridor 500. It can be seen that determined driving corridor 500 widens traversed route envelope 450 by a tolerance area 510 shown here in hatched fashion, which tolerance area may thus also be driven upon during the driver assistance method to be carried out later.

Figure 6:
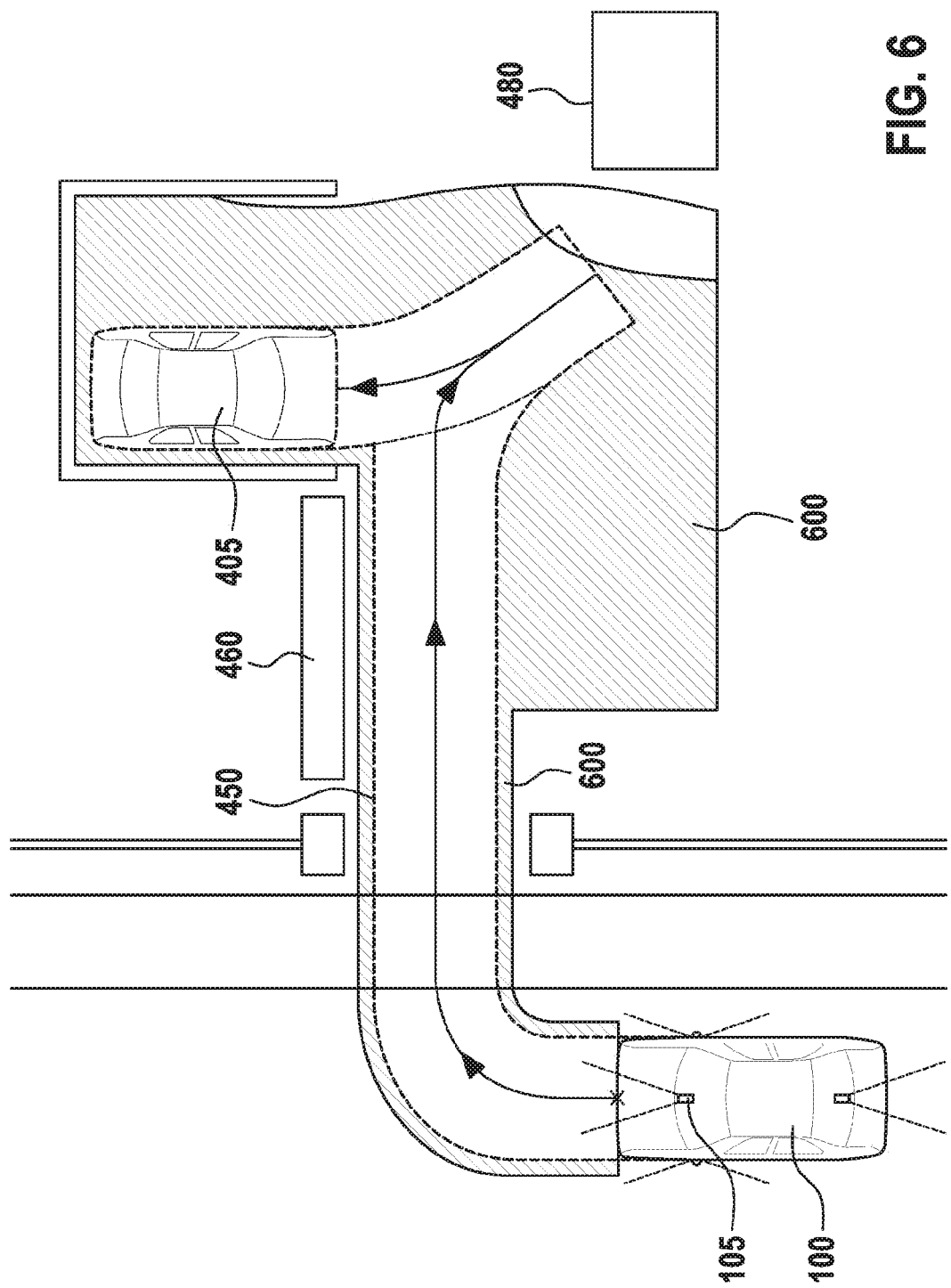
FIG. 6 shows a representation of a surrounding environment model, including a pre-adapted driving corridor in accordance with an example embodiment of the present invention.

FIG. 6 shows a surrounding environment model according to FIGS. 4 and 5 with overlaid pre-adapted driving corridor 600. It can be seen that on account of a segment detected by image processing the determined driving corridor is widened to include asphalted ground. In addition, a children's playground segment was detected by image processing, a pre-defined minimum distance zone being provided for this area. The pre-adapted driving corridor is consequently adapted based on the determined driving corridor and the detected "asphalted ground" and "children's playground" segments. Optionally, or in addition, detected segments, segment boundaries, objects and/or object boundaries may be emphasized in the displaying of the overlaid driving corridor so that a user may easily orient himself relative to a detected segment, segment boundary, object and/or object boundary while the input for adapting the boundary of the overlaid driving corridor is being recorded.

Figure 7:
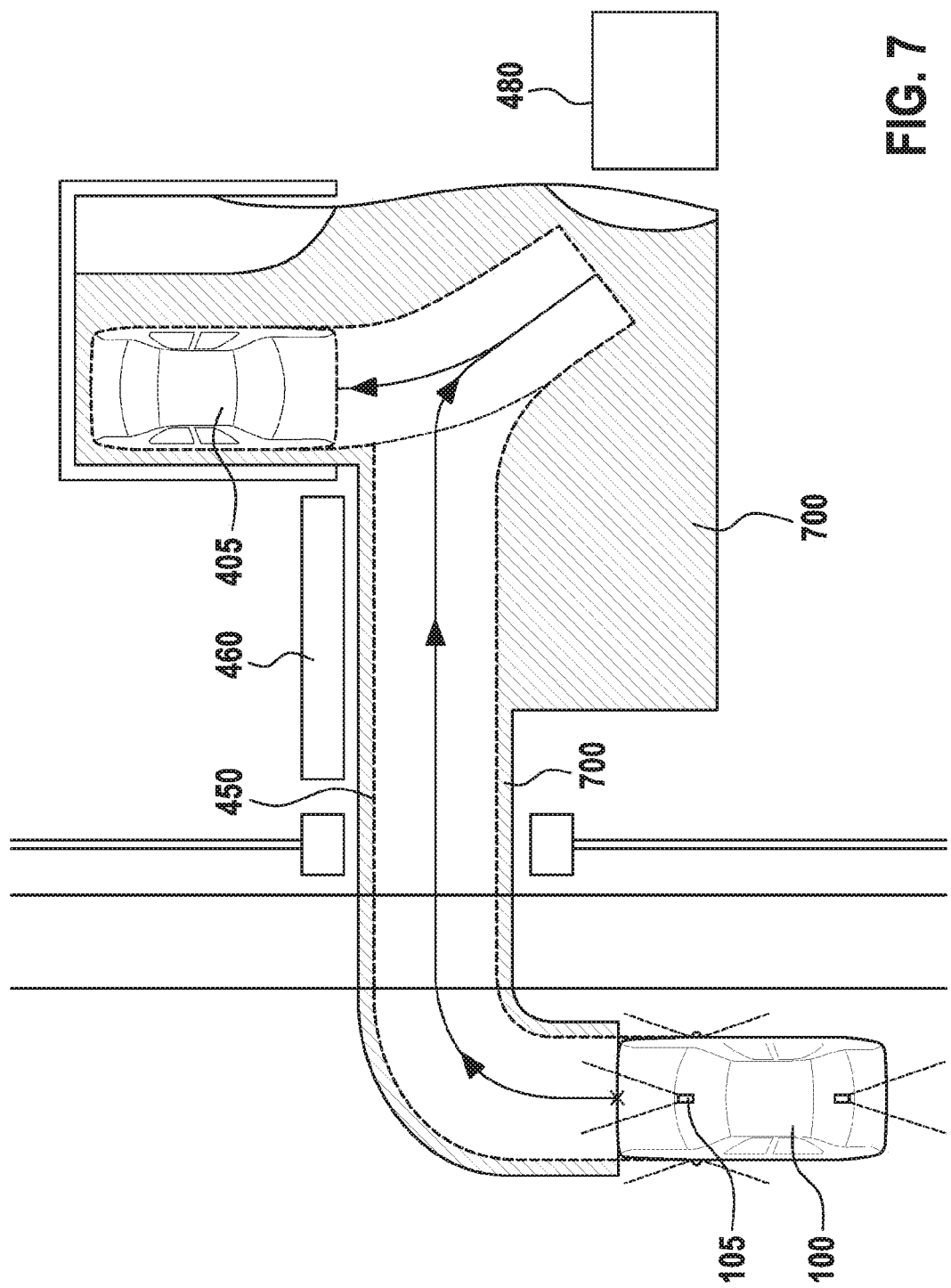
FIG. 7 shows a representation of a surrounding environment model, including an adapted driving corridor in accordance with an example embodiment of the present invention.

FIG. 7 shows a representation of a surrounding environment model according to FIGS. 4 to 6, a driving corridor (700) adapted by the user being superimposed onto the surrounding environment model as an overlay. It can be seen that the user has changed the boundary of the pre-adapted driving corridor at specific points, for example by shifting the boundary of the pre-adapted driving corridor in FIG. 6 on a touchscreen so that the adapted driving corridor additionally contains, or no longer contains, specific areas.

Figure 8:
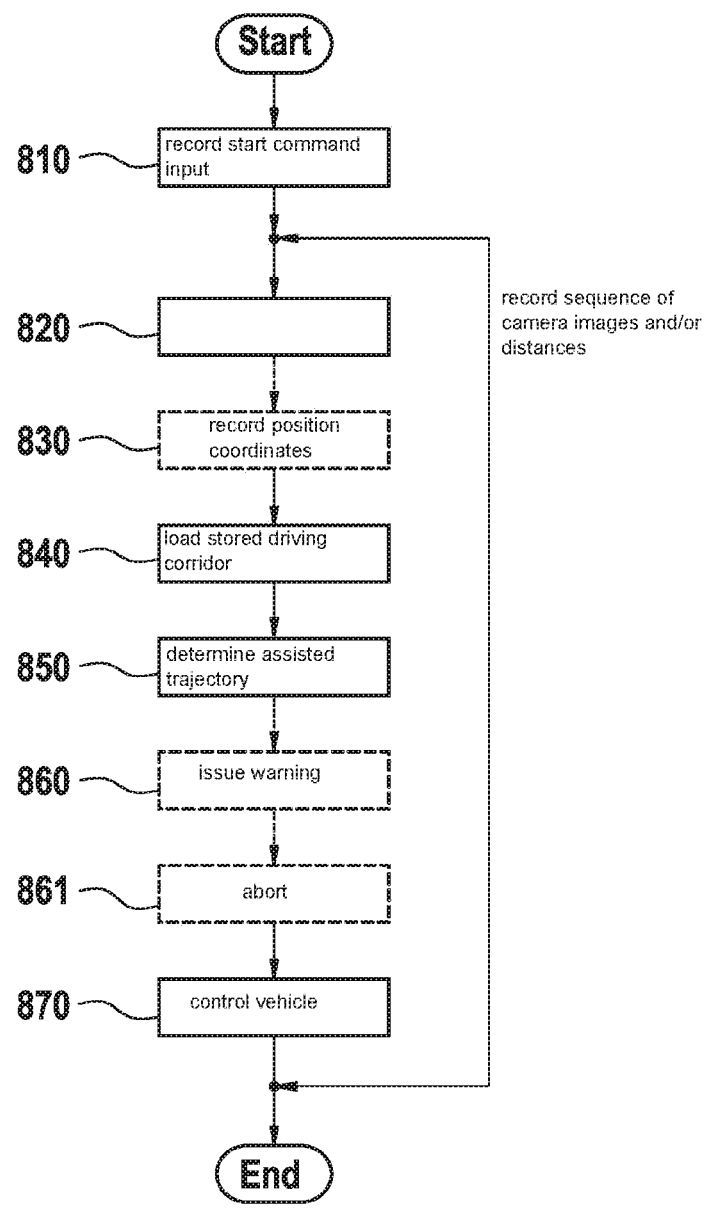
FIG. 8 shows a flow diagram of the driver assistance method as a block diagram in accordance with an example embodiment of the present invention.

FIG. 8 shows a flow diagram of the driver assistance method as a block diagram. The driver assistance method begins with a recording 810 of a start command input. This method step may be performed via a manual input by the user or may be automated based on recorded current position coordinates of vehicle 100. Subsequently, in step 820, a sequence of camera images and/or distances between vehicle 100 and objects in a surrounding environment of vehicle 100 are recorded. This recording 820 is carried out continuously during the entire driver assistance method. In another method step 840, the stored driving corridor 500, 600 or 700 is loaded by computing unit 201 of control device 104 from electronic memory 202 of control device 104. As an option, the loading 840 is performed based on position coordinates recorded in an optional step 830. Subsequently, computing unit 201 determines, in step 850, at least one assisted trajectory based on a vehicle geometry, based on the recorded sequence of camera images and/or the recorded distances, and based on the loaded driving corridor 500, 600 or 700. The vehicle geometry of vehicle 100 is also stored in memory 202, for example. The assisted trajectory may deviate in any manner from the trajectory traversed during the training method. Nevertheless, the assisted trajectory always lies inside the loaded driving corridor 500, 600 or 700. Thereupon, vehicle 100 is controlled 870 in a time-delayed manner, for example, based on the determined assisted trajectory, at least one drive motor 101 and/or one steering motor 102 of vehicle 100 being automatically controlled, for example. This allows the user of the driver assistance method to leave vehicle 100 at the start position or shortly after providing the start command input. There may be a further provision for the user to be warned, for example on a mobile electronic device 121, and for the driver assistance method to be ended if in step 850 no assisted trajectory free of obstructions may be determined within the loaded driving corridor 700. The recording 820 of the sequence of camera images and/or distances, the determining 840 of the assisted trajectory, the warning 860 as well as the abortion 861 and the controlling 870 of vehicle 100 are repeated until the target position 405 is reached, so that for example the determined assisted trajectory may be continuously updated or adapted.

What is claimed is:

1. A training method for a driver assistance method of a vehicle, the vehicle including at least one camera, the method comprising the following steps:
   recording a sequence of camera images during a training run of the vehicle, guided by a user, along a desired trajectory;
   determining a driving corridor for the driver assistance method along the desired trajectory based on image processing of the recorded sequence of camera images;
   displaying, on a display, the recorded sequence of camera images and/or a surrounding environment model determined based on the recorded sequence of camera images on a display, at least the determined driving corridor being displayed as an overlay superimposed on the display;
   storing the driving corridor in an electronic memory of the vehicle;
   recording an input by the user, during the displaying, for adapting a boundary of the determined driving corridor;
   adapting the determined driving corridor based on the recorded input;
   detecting at least one segment, and/or segment boundary, and/or object edge and/or object based on an image analysis of at least one recorded camera image and/or based on recorded distances; and
   pre-adapting the determined driving corridor based on the detected segment and/or detected segment boundary and/or detected object edge and/or detected object.

2. The training method as recited in claim 1, further comprising the following steps:
   recording position coordinates of the vehicle during the training run of the vehicle guided by the user; and
   assigning the stored driving corridor to the recorded position coordinates.

3. The training method as recited in claim 1, further comprising the following steps:
   recording distances between the vehicle and objects in a surrounding environment of the vehicle during the training run of the vehicle guided by the user, a surrounding environment model and/or a depth map being determined based on the recorded distances; and
   determining the driving corridor also based on the recorded distances.

4. The training method as recited in claim 1, wherein the adapting of the determined driving corridor based on the recorded input by the user is performed in sections along the determined driving corridor and/or based on markings indicated in the display at boundaries of the superimposed driving corridor.

5. The training method as recited in claim 1, wherein the displaying of the recorded sequence of camera images and/or of the determined surrounding environment model occurs on a display of a mobile electronic device, and the recording of the input of the user for adapting the boundary of the determined driving corridor is performed using the mobile electronic device.

6. The training method as recited in claim 1, further comprising the following steps:
   recording a time input by the user for carrying out the driver assistance method; and
   assigning the stored driving corridor to the recorded time input.

7. A driver assistance method for a vehicle, comprising the following steps:
   recording a start command input;
   recording a sequence of camera images and/or distances between the vehicle and objects in a surrounding environment of the vehicle;
   loading a stored driving corridor, the stored driving corridor having been determined via a training method, the driving method including:
      recording a first sequence of camera images during a training run of the vehicle, guided by a user, along a desired trajectory;
      determining a driving corridor for the driver assistance method along the desired trajectory based on image processing of the recorded first sequence of camera images;
      displaying, on a display, the recorded first sequence of camera images and/or a surrounding environment model determined based on the recorded first sequence of camera images on a display, at least the determined driving corridor being displayed as an overlay superimposed on the display;

storing the determined driving corridor in an electronic memory of the vehicle;

recording an input by the user, during the displaying, for adapting a boundary of the determined driving corridor;

adapting the determined driving corridor based on the recorded input;

detecting at least one segment, and/or segment boundary, and/or object edge and/or object based on an image analysis of at least one recorded camera image and/or based on recorded distances; and pre-adapting the determined driving corridor based on the detected segment and/or detected segment boundary and/or detected object edge and/or detected object;

determining at least one assisted trajectory based on: (i) a geometry of the vehicle, (ii) the recorded sequence of camera images and/or the recorded distances, and (iii) the loaded driving corridor; and controlling the vehicle based on the determined assisted trajectory, at least one drive motor and/or one steering motor of the vehicle being controlled by the controlling.

8. The driver assistance method as recited in claim 7, further comprising the following steps:

recording position coordinates of the vehicle; and loading the stored driving corridor based on the recorded position coordinates.

9. The driver assistance method as recited in claim 7, further comprising the following steps:

prior to the controlling the drive motor and/or the steering motor:

warning the user on a mobile electronic device, and aborting the driver assistance method if no assisted trajectory can be determined within the loaded driving corridor which is free of obstacles.

10. The driver assistance method as recited in claim 7, wherein the recording of the start command input is performed automatically based on a time input assigned to the loaded driving corridor.

11. A control device configured to:

record a sequence of camera images during a training run of a vehicle, guided by a user, along a desired trajectory;

determine a driving corridor for a driver assistance method along the desired trajectory based on image processing of the recorded sequence of camera images;

display, on a display, the recorded sequence of camera images and/or a surrounding environment model determined based on the recorded sequence of camera images on a display, at least the determined driving corridor being displayed as an overlay superimposed on the display;

store the driving corridor in an electronic memory of the vehicle;

record an input by the user, during the displaying, for adapting a boundary of the determined driving corridor;

adapt the determined driving corridor based on the recorded input;

detecting at least one segment, and/or segment boundary, and/or object edge and/or object based on an image analysis of at least one recorded camera image and/or based on recorded distances; and pre-adapting the determined driving corridor based on the detected segment and/or detected segment boundary and/or detected object edge and/or detected object.

12. The control device as recited in claim 11, wherein the control device is further configured to:

record a start command input;

record a second sequence of camera images and/or distances between the vehicle and objects in a surrounding environment of the vehicle;

load the stored driving corridor;

determine at least one assisted trajectory based on: (i) a geometry of the vehicle, (ii) the recorded second sequence of camera images and/or the recorded distances, and (iii) the loaded driving corridor; and control the vehicle based on the determined assisted trajectory, at least one drive motor and/or one steering motor of the vehicle being controlled by the controlling.

13. A vehicle, comprising:

a control device control device configured to:

record a sequence of camera images during a training run of a vehicle, guided by a user, along a desired trajectory;

determine a driving corridor for a driver assistance method along the desired trajectory based on image processing of the recorded sequence of camera images;

display, on a display, the recorded sequence of camera images and/or a surrounding environment model determined based on the recorded sequence of camera images on a display, at least the determined driving corridor being displayed as an overlay superimposed on the display;

store the driving corridor in an electronic memory of the vehicle;

record an input by the user, during the displaying, for adapting a boundary of the determined driving corridor;

adapt the determined driving corridor based on the recorded input;

detecting at least one segment, and/or segment boundary, and/or object edge and/or object based on an image analysis of at least one recorded camera image and/or based on recorded distances; and pre-adapting the determined driving corridor based on the detected segment and/or detected segment boundary and/or detected object edge and/or detected object.

14. The vehicle as recited in claim 13, wherein the control device is further configured to:

record a start command input;

record a second sequence of camera images and/or distances between the vehicle and objects in a surrounding environment of the vehicle;

load the stored driving corridor;

determine at least one assisted trajectory based on: (i) a geometry of the vehicle, (ii) the recorded second sequence of camera images and/or the recorded distances, and (iii) the loaded driving corridor; and control the vehicle based on the determined assisted trajectory, at least one drive motor and/or one steering motor of the vehicle being controlled by the controlling.

* * * * *